May 27, 1930.   E. E. FORREST   1,760,130
POLE HITCH
Filed Jan. 18, 1929
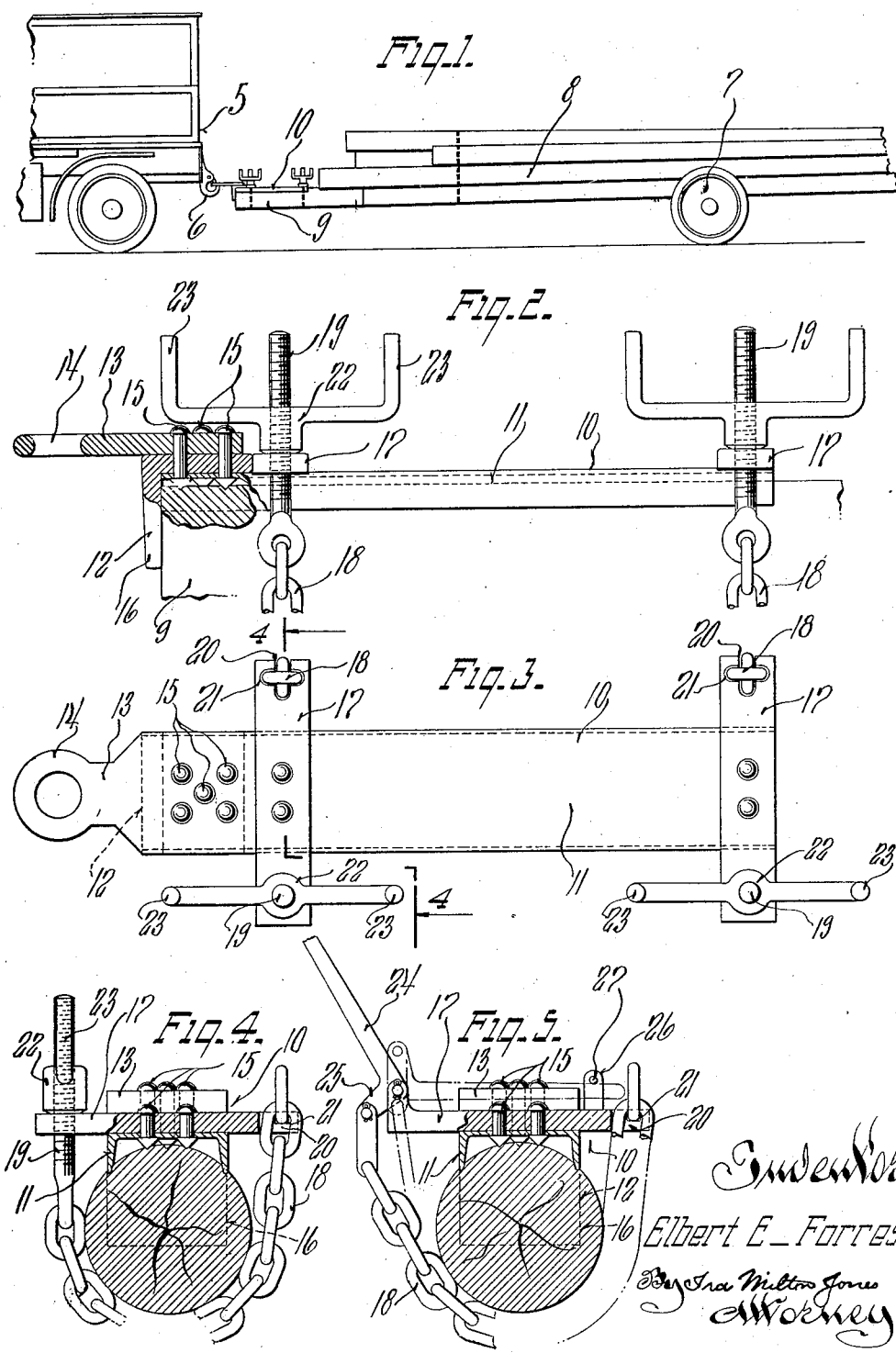

Patented May 27, 1930

1,760,130

UNITED STATES PATENT OFFICE

ELBERT E. FORREST, OF GARY, INDIANA, ASSIGNOR, BY MESNE ASSIGNMENTS, TO LINE MATERIAL COMPANY, OF SOUTH MILWAUKEE, WISCONSIN, A CORPORATION OF DELAWARE

POLE HITCH

Application filed January 18, 1929. Serial No. 333,311.

This invention relates to certain new and useful improvements in attaching devices and refers more particularly to a device adapted to connect a trailer carried telegraph pole or the like with an automotive truck or other means of transportation.

Heretofore, it has been customary to lash a chain about the forward end of a pole being carried by a trailer and to secure its end to the draw bar of a truck or the like, but inasmuch as the slack in the chain often permitted the load to whip back and forth, this manner of attaching a load was undesirable and in some instances dangerous. It is, therefore, an object of this invention to provide an improved attaching means or pole hitch which is readily detachably securable to a telegraph pole or the like being transported by a trailer to provide means for connecting it with a truck.

Another object of this invention resides in the provision of a device of the character described which is readily adaptable to various types of poles including the conventional wood and structural steel poles, and which may be quickly attached or detached.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated two complete examples of the physical embodiment of my invention constructed according to the best mode I have so far devised for the practical application of the principles thereof, and in which:

Figure 1 is an elevational view illustrating the rear end of a truck and a trailer carrying a number of wooden telegraph poles and showing the manner in which my improved hitch is used;

Figure 2 is a side elevational view with parts broken away and in section of the device detached from the truck;

Figure 3 is a top view thereof;

Figure 4 is a cross sectional view taken through Figure 3 on the plane of the line 4—4; and Figure 5 is a view similar to Figure 4 illustrating a slightly modified form of my invention.

Referring now more particularly to the accompanying drawings, in which like numerals designate like parts throughout the several views, the numeral 5 represents a truck having a suitable hook or draw bar 6 secured to its rear end to provide means for connecting trailers and the like. In the present instance, the trailer, which includes a pair of wheels 7, is shown supporting a number of wooden telegraph poles 8 or the like, one of which has its forward end 9 projecting beyond the others, and having the attaching device 10 secured thereto to connect the trailer with the hook 6 of the truck.

The attaching device consists of a main member 11 formed of a length of channel iron, to the forward end of which an L shaped member 12 and a plate 13 having an attaching eye 14 in its outer end are secured by rivets 15 or the like. The vertical flange 16 of the L shaped member 12 extends downwardly and provides a stop against which the adjacent end 9 of the pole abuts.

Cross pieces 17 are fixed to the ends of the channel 11, and have chains 18 adjustably connected therewith to provide means for attaching the device to the pole. One end of each cross piece 17 is apertured to receive an adjusting screw 19, connected with each chain, and the other ends are provided with longitudinal slots 20 and transverse recesses 21 communicating with the slots to detachably receive the free ends of the chains. A tension screw 22 having actuating arms 23 extended therefrom is threaded on each screw 19 to draw the chains, which are passed around the pole, as illustrated in Figure 4, securely about the same, thus clamping the device to the pole, as will be readily apparent.

In Figure 5, a slightly modified form of chain tensioning device is illustrated which obviates the necessity of the screws 19 and employs a bell crank lever 24 pivoted at its apex to one end of the cross pieces 17. The adjacent end of each chain is connected with the short arm 25 of the bell crank 24, so that when the bell crank is moved to the right with respect to Figure 5, the outer end of the arm 25 to which the chain is attached, moves beyond an imaginary line drawn from the pivot of the bell crank to the axis of the chain at its point of tangency with the pole thus securing the bell crank and consequently the chain against detachment. To further prevent the release of the bell crank lever, lugs or ears 26 are fixed to the opposite end of the cross pieces 17 between which the free end of the lever 24 passes, where it is secured by a pin 27 passed through the lugs 26.

From the foregoing description, taken in connection with the accompanying drawing, it will be readily apparent to those skilled in the art to which an invention of the character described appertains, that I provide a novel means for attaching telegraph poles and the like being carried by a trailer to an automotive truck which precludes the possibility of the load whipping back and forth, and which may be quickly attached or removed from a pole.

What I claim as my invention is:

1. A device for attaching a pole or the like supported upon a trailer with a vehicle or the like, comprising a main member adapted to be readily detachably secured to the pole, a cross piece carried by the main member, a chain passed about the pole and having one end detachably connected with one end of the cross piece, means carried by the other end of the cross piece for drawing the chain tightly about the pole, a stop member carried by the main member against which the adjacent end of the pole abuts, and an eye plate carried by the main member by which the device is connectable with the vehicle.

2. A device for attaching a pole or the like supported upon trailer to a vehicle or the like, comprising a channel member adapted to longitudinally engage the pole, a cross piece secured to the channel member, a chain passed about the pole and having one end readily detachably connected with one end of the cross piece, means carried by the outer end of the cross piece for drawing the chain tightly about the pole so that the chain and the longitudinal flanges of the channel member bite into the pole to secure the channel member against movement with respect to the pole, a stop member carried by the channel member against which the adjacent end of the pole abuts, and an eye plate carried by the channel member and extended therebeyond to provide means of connection with the vehicle.

In testimony whereof I have hereunto affixed my signature.

ELBERT E. FORREST.